United States Patent
Wang

(10) Patent No.: US 9,571,305 B2
(45) Date of Patent: Feb. 14, 2017

(54) CHANNEL ESTIMATION BY TIME-DOMAIN PARAMETER EXTRACTION

(71) Applicant: Xiao-an Wang, Allentown, PA (US)

(72) Inventor: Xiao-an Wang, Allentown, PA (US)

(*) Notice: Subject to any disclaimer, the term of this patent is extended or adjusted under 35 U.S.C. 154(b) by 583 days.

(21) Appl. No.: 13/648,254

(22) Filed: Oct. 9, 2012

(65) Prior Publication Data

US 2014/0098704 A1    Apr. 10, 2014

(51) Int. Cl.
  *H04L 12/28*    (2006.01)
  *H04L 25/02*    (2006.01)

(52) U.S. Cl.
  CPC ......... *H04L 25/0212* (2013.01); *H04L 25/022* (2013.01); *H04L 25/025* (2013.01); *H04L 25/0224* (2013.01); *H04L 25/0256* (2013.01)

(58) Field of Classification Search
  None
  See application file for complete search history.

(56) References Cited

U.S. PATENT DOCUMENTS

| | | | |
|---|---|---|---|
| 8,908,587 B2* | 12/2014 | Wang ................. | H04W 72/005 370/312 |
| 2004/0203442 A1* | 10/2004 | Krishnan et al. .......... | 455/67.11 |
| 2007/0076804 A1* | 4/2007 | Sestok et al. ................. | 375/260 |
| 2007/0133668 A1* | 6/2007 | Naguib et al. ................ | 375/227 |
| 2010/0008431 A1* | 1/2010 | Wu et al. ...................... | 375/244 |
| 2010/0303182 A1* | 12/2010 | Daneshrad et al. .......... | 375/346 |
| 2011/0096853 A1* | 4/2011 | Jayaraman .......... | H04L 25/0222 375/260 |
| 2012/0263245 A1* | 10/2012 | Carbonelli et al. .......... | 375/260 |

* cited by examiner

*Primary Examiner* — Jutai Kao

(57) ABSTRACT

Methods and apparatus of channel estimation using time-domain parameter extraction are disclosed. The wireless channel can be modeled by a multipath model with a limited number of parameters in the continuous time domain. In the discrete time domain, the multipath model leads to channel impulse responses that have a limited number of channel taps with non-negligible energy. Extracting the time-domain parameters and then reconstructing the channel yields channel estimates that have better accuracy. Time-domain parameter extraction also has lower computational complexity than existing methods.

11 Claims, 3 Drawing Sheets

CHANNEL ESTIMATION BY TIME-DOMAIN PARAMETER EXTRACTION

BACKGROUND

Field of Application

The following description relates generally to telecommunications systems and wireless communications systems.

Prior Art

Channel estimation plays a key role in modern communications systems. When data is transmitted over a communications channel, the receiver needs the knowledge of the channel for data recovery, thus channel estimation is a critical function in the receiver. The quality of the channel estimation directly influences the receiver performance in terms of bit error rate and/or block error rate.

State-of-the-art wireless cellular networks employ highly spectrum-efficient transmissions such as high-order modulation and MIMO (multi-input multi-output). Such transmission schemes require even more accurate channel estimations in order to successfully recover data at the receiver. Typically channel estimation is derived from the correlation of a known pilot signal and the received signal. The accuracy of the correlation approach is limited by the correlation length and the signal-to-noise ratio (SNR), which can be poor when the channel changes rapidly or when the mobile user is at the cell edge. For example, in an OFDM (orthogonal frequency division multiplexing) network such as LTE (long-term evolution), the pilot signals are carried by certain subcarriers in frequency domain, and the channel at each pilot subcarrier can be estimated independently. If, however, the mobile user is at the edge of the serving cell, the interference from other neighbor cells can be much stronger than the pilot subcarriers. Consequently, the channel estimation quality can be very low.

The accuracy of the channel estimation can be improved by certain optimum approaches according to various criteria. Among them are least square (LS) and minimum mean-square error (MMSE). Those approaches, when applied to LTE systems, however, are often computationally intensive due to processing of large matrices, the dimension of which can be up to several hundreds. This is far beyond the processing power in the mobile-user devices to date and in the near future.

Accordingly, methods, apparatus, and systems that provide efficient and accurate channel estimation are highly desired.

SUMMARY

The following presents a summary of various aspects of the claimed subject matter. The summary is intended to be neither an extensive overview of all contemplated aspects nor a delineation of the scope of any or all aspects. The purpose of the summary is to present some concepts of one or more aspects in a simplified form in order to provide a basic understanding of such aspects, the more detailed descriptions of which are presented later.

The subject disclosure provides for improved channel estimation by extracting the time-domain parameters (TDP) of the channel from the channel observations. The TDPs can be considered as the time-domain representation of the channel estimation. The reconstructed channel from the extracted TDPs is more accurate than the channel observations that were used as the channel estimations in prior art.

In some aspects of the subject disclosure, a continuous time-domain multipath model is used to specify the TDPs. The TDPs in the continuous time domain include the number of multipaths, multipath delays, and complex amplitudes of multipaths. The TDPs are derived by minimizing the matching error in the time-domain or in the frequency-domain. The channel estimates are then reconstructed from the continuous time-domain model, which is more accurate than the channel observations.

In some other aspects of the subject disclosure, the TDPs are derived via recursive minimization of the matching error. Recursive minimization is more computationally efficient, and provides natural and convenient ways to determining the number of multipaths. Moreover, the TDPs from the recursive minimization can be refined. The refined TDPs can be obtained by minimizing the matching error with the TDPs from the recursive minimization as the initial guess. Alternatively, the multipath amplitudes can be refined by minimizing the matching error with the multipath delays obtained from the recursive minimization.

In still some other aspects of the subject disclosure, the TDPs are extracted from the discrete time domain. The TDPs in the discrete time domain are the number, indices, and complex amplitudes of the channel taps. Channel taps are selected based on the strengths of the channel observations in the time domain. The channel estimates are then reconstructed from the discrete TDPs, which is more accurate than the channel observations.

In some more aspects of the subject disclosure, the amplitudes of the channel taps are selected to minimize the matching error at given indices of the channel taps. This further improves the channel estimation accuracy. Diagonal loading can be applied to make the minimization numerically stable. Alternatively, the amplitudes of the channel taps can also be selected to minimize a Bayesian risk.

In some further aspects of the subject disclosure, spectrum-shaping can be incorporated, which eliminates the out-of-band channel energy in the case that channel observations in the frequency domain covers only part of the frequency band.

Accordingly several advantages are to provide means of accurate and efficient channel estimation. Still further advantages and novel features will become apparent from a study of the following description and the accompanying drawings.

DETAILED DESCRIPTION

Figure 1:
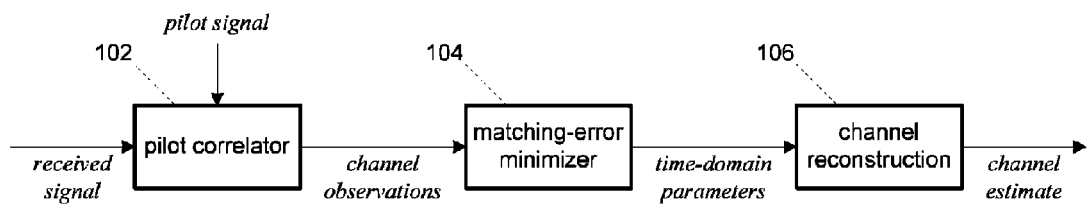
FIG. 1 illustrates an example block diagram for channel estimation by TDP extraction.

The disclosed subject matter will now be described more fully hereinafter with reference to the accompanying drawings, in which some, but not all aspects or embodiments, are shown with like numerals referring to like elements throughout the description. Specific details are described for the purpose of providing a thorough understanding of the subject innovation. It may be understood by those skilled in the art, however, that the disclosed subject matter may be practiced without these specific details. Various aspects may be embodied in many different forms and should not be construed as limited to the embodiments set forth herein. In other instances, well-known methods, procedures, and components have not been described in detail so as not to obscure the subject innovation.

In a communications system, a certain portion of the total transmitted signal is allocated to carry a pilot signal that is known to the receiver. The receiver estimates the channel by correlating the received signal with the known pilot. The results of the correlations are commonly referred to as the channel estimations in prior art. To distinguish between the channel estimations in the prior art and the improved channel estimations in various aspects of the subject disclosure, the correlation-based channel estimations will be referred to as the channel observations hereinafter. Channel estimations with improved accuracy can be obtained from the channel observations using various embodiments described herein.

The pilot can take different forms in various communications systems. For example, in a CDMA (code-division multiple access) system, the pilot is assigned to certain code channels and is transmitted along with the useful data in other code channels. In an OFDM system, the pilot is assigned to certain subcarriers at given frequencies within the signal bandwidth. The pilot and the useful data can also be multiplexed in time. Depending on the pilot type and/or the correlation method, the channel observations can be in the time domain or in the frequency domain. Note that the time-domain channel observations may be transformed to the frequency domain and vice versa.

A wireless baseband channel can be modeled in the time domain as follows:

$$h(t) = \sum_{l=0}^{L-1} \alpha_l s(t - \tau_l) \quad (1)$$

where L is the number of multipaths, $\alpha_l$ and $\tau_l$ is the complex amplitude and the propagation delay of the l-th path, respectively, and s(t) is the combined transmitter and receiver response in baseband, including the pulse shaping filter at the transmitter and match filter at the receiver. Hereinafter term "complex amplitude" will simply be referred to as "amplitude" when the context is clear. The corresponding frequency-domain channel is then $$y(\omega) = \sum_{l=0}^{L-1} \alpha_l S(\omega) e^{-j\omega \tau_l} \quad (2)$$

where $S(\omega)$ is the Fourier transform of the baseband response s(t). In the frequency domain, the channel observation at frequency $\omega_k$ is denoted as $y_k$. In the time domain, the channel observation at time $t_n$ is denoted as $h_n$.

The channel model in Eq. (1) or (2) is referred to as the continuous time-domain multipath model. The time domain parameters in the continuous time-domain multipath model are the number of multipaths L, multipath amplitudes $\alpha_l$, and multipath delays $T_l$, l=0, 1, ..., L−1.

The new generation of wireless cellular networks employs wide bandwidth and high sample rate. As a result, the number of the channel observations in both the time domain and the frequency domain can be very large. For example, in the LTE network, there are up to 400 channel observations in the frequency domain. In contrast, the number of the TDP is generally quite small due to the "sparseness" of the multipaths. While in theory there can be infinitely many multipaths, in real wireless propagation environment, the multipaths tend to appear in sparsely spaced clusters. The multipaths in each cluster have very small differences in propagation delays such that all multipaths in a cluster can be represented by a single effective multipath. Hereinafter term "effective multipath" will simply be referred to as "multipath" when the context is clear. It is the sparseness of the multipaths that makes the number of the TDPs small.

The sparseness of the multipaths in wireless channels has been validated by many years of successful operations of cellular networks. For example, the rake receiver is based on the sparseness of the multipaths, and has been a core component in 3G cellular networks.

The TDPs can be extracted from K frequency-domain channel observations via the following minimization problem:

$$\text{minimize } J_F(L, \alpha_0, \ldots, \alpha_{L-1}, \tau_0, \ldots, \tau_{L-1}) = \quad (3)$$
$$\sum_{k=0}^{K-1} \left| S(\omega_k) \sum_{l=0}^{L-1} \alpha_l e^{-j\omega_k \tau_l} - y_k \right|^p$$

where $J_F(L, \alpha_0, \ldots, \alpha_{L-1}, \tau_0, \ldots, \tau_{L-1})$ is referred to as the frequency-domain matching error, p>0 is referred to as the error norm. For example, p=2 results in the familiar LS solution, while a very large p leads to the minimum-maximum error solution. It can be appreciated that the frequency-domain matching error can also take other appropriate forms than Eq. (3). Alternatively, the TDPs can be extracted from N time-domain channel observations via the following minimization problem:

$$\text{minimize } J_T(L, \alpha_0, \ldots, \alpha_{L-1}, \tau_0, \ldots, \tau_{L-1}) = \quad (4)$$
$$\sum_{n=0}^{N-1} \left| \sum_{l=0}^{L-1} \alpha_l s(t_n - \tau_l) - h_n \right|^p$$

where $J_T(L, \alpha_0, \ldots, \alpha_{L-1}, \tau_0, \ldots, \tau_{L-1})$ is referred to as the time-domain matching error. The minimizations in Eqs. (3) and (4) are referred to as the full minimization hereinafter, to distinguish from the recursive minimization that will be described later.

The number of the multipaths L is an integer, so searching for the optimum L in the full minimization problem in Eq. (3) or (4) may require large amount of computations. One approach to reducing the computations is to have an initial estimate of L prior to minimization. L is closely related to the delay profile of the channel, i.e., the channel energy distribution in time domain. Thus L, or the range of L, may be estimated from the channel delay profile. The computations can also be reduced by making use of the fact that the channel delay profile and L change more slowly compared to the multipath amplitudes. Once an optimum L is found, the same L can be used in several subsequent minimization sessions. When L need to be updated, it can be assumed that the new optimum $L_{new}$ is not very far away from the previous optimum $L_{old}$. For example, the search candidates for $L_{new}$ can be restricted to the set $$\{L_{old}-1, L_{old}, L_{old}+1\}.$$

Subspace-based methods, such as multiple signal clarification (MUSIC) and estimation of signal parameters via rotational invariance techniques (ESPRIT), can also be used to provide estimates on L and $\tau_0, \ldots, \tau_{L-1}$.

Let $\hat{L}, \hat{\alpha}_0, \ldots, \hat{\alpha}_{L-1}, \hat{\tau}_0, \ldots, \hat{\tau}_{L-1}$ be a solution to the minimization problem in Eq. (3) or (4). The time-domain channel estimate is the reconstructed channel according to Eq. (1) by $\hat{L}, \hat{\alpha}_0, \ldots, \hat{\alpha}_{L-1}, \hat{\tau}_0, \ldots, \hat{\tau}_{L-1}$:

$$\hat{h}(t) = \sum_{l=0}^{\hat{L}-1} \hat{\alpha}_l s(t - \hat{\tau}_l) \quad (5)$$

If the frequency-domain channel estimate is desired, the channel can be reconstructed according to Eq. (2) by $\hat{L}, \hat{\alpha}_0, \ldots, \hat{\alpha}_{L-1}, \hat{\tau}_0, \ldots \hat{\tau}_{L-1}$:

$$\hat{y}(\omega) = S(\omega) \sum_{l=0}^{\hat{L}-1} \hat{\alpha}_l e^{-j\omega \hat{\tau}_l} \quad (6)$$

The channel estimations from Eq. (5) or (6) are generally more accurate than the channel observations, i.e., the correlation-based channel estimation. The reason is that in typical wireless channels, the channel observation size, K or N, is much larger than L, which is closely related to the number of the TDPs. Therefore, when the TDPs are extracted from the channel observations according to Eq. (3) or (4), the estimation noise of the TDPs is much smaller than that of the channel observations. Accordingly the channel estimations from the reconstructed channel by the time-domain are less noisy than channel observations.

Another advantage is that the reconstructed channel in Eq. (5) or (6) provides channel estimations between the sampling points on which the channel observations are made. For example, in the LTE network, the channel observations are made on pilot subcarrier frequencies. The channel between two pilot subcarriers is obtained via interpolations in existing methods. Interpolations, however, introduce interpolation errors, especially when channel is long, i.e., the channel has a long delay spread. This, coupled with the noisy channel observations on which the interpolation is based, results in poor channel estimation quality between pilot subcarriers. Eq. (5) or (6) presents a proper model that produces channel estimates anywhere between the channel observations with better estimation quality.

FIG. 1 illustrates an example block diagram for channel estimation by TDP extraction. Pilot correlator 102 generates channel observations by correlating the received signal with the pilot signal. Note that the channel observations can be in the time domain or in the frequency domain, depending on the application. The pilot correlator can be implemented directly with correlation operations, or indirectly with means such as the discrete Fourier transform (DFT). Matching-error minimizer 104 extracts the TDPs from the channel observations by minimizing a matching error that is a function of the TDPs. Note that the matching error can be a time-domain matching error or a frequency-domain matching error. Channel reconstruction apparatus 106 reconstructs the channel from the extracted TDPs according to Eq. (5) or (6). The reconstructed channel is the desired channel estimation.

According to some aspects, the full minimization in the frequency domain in Eq. (3) can be replaced with a recursive minimization defined as follows:

$$\text{minimize } J_{F,l}(\alpha_l, \tau_l \mid \alpha_0, \ldots, \alpha_{l-1}, \tau_0, \ldots, \tau_{l-1}) = \quad (7)$$

$$\sum_{k=0}^{K-1} |\alpha_l S(\omega_k) e^{-j\omega_k \tau_l} + \varepsilon_{l-1,k}|^p$$

where $J_{F,l}(\alpha_l, \tau_l \mid \alpha_0, \ldots, \alpha_{l-1}, \tau_0, \ldots, \tau_{l-1})$ is referred to as the frequency-domain matching error at iteration l, and $$\varepsilon_{l-1,k} = S(\omega_k) \sum_{m=0}^{l-1} \alpha_m e^{-j\omega_k \tau_m} - y_k, \varepsilon_{-1,k} = -y_k \quad (8)$$

is referred to as the mismatch in the frequency domain at iteration l-1. The recursive minimization in Eq. (7) seeks the minimum over $\alpha_l$ and $\tau_l$, given $\alpha_0, \ldots, \alpha_{l-1}$ and $\tau_0, \ldots, \tau_{l-1}$ from previous iterations. This is in contrast to the minimization problem in Eq. (3), where the minimization is over $\alpha_0, \ldots, \alpha_{L-1}, \tau_0, \ldots, \tau_{L-1}$, and L. As a result, minimization in Eq. (7) requires much less computations than the full minimization in Eq. (3). When the error norm p=2, the frequency-domain matching error in Eq. (7) can be further simplified as $$J_l(\alpha_l, \tau_l \mid \alpha_0, \ldots, \alpha_{l-1}, \tau_0, \ldots, \tau_{l-1}) = \quad (9)$$

$$J_{l-1}(\alpha_{l-1}, \tau_{l-1} \mid \alpha_0, \ldots, \alpha_{l-2}, \tau_0, \ldots, \tau_{l-2}) +$$

$$\sum_{k=0}^{K-1} (|\alpha_l|^2 |S(\omega_k)|^2 + 2\text{Re}\{\alpha_l S(\omega_k) e^{-j\omega_k \tau_l} \varepsilon_{l-1,k}^*\})$$

It follows that minimization of Eq. (9) can be written as $$\underset{\alpha_l, \tau_l}{\text{minimize}} |\alpha_l|^2 \sum_{k=0}^{K-1} |S(\omega_k)|^2 + 2 \sum_{k=0}^{K-1} \text{Re}\{\alpha_l S(\omega_k) e^{-j\omega_k \tau_l} \varepsilon_{l-1,k}^*\} \quad (10)$$

The solution for $\tau_l$ of Eq. (10) is as follows:

$$\underset{\tau_l}{\text{argmax}} \left| \sum_{k=0}^{K-1} S(\omega_k) e^{-j\omega_k \tau_l} \varepsilon_{l-1,k}^* \right|^2 \quad (11)$$

Many efficient algorithms exist for solving Eq. (11). Once $\tau_l$ is solved, the solution for $\alpha_l$ of Eq. (10) is given by $$\alpha_l = -\frac{\sum_{k=0}^{K-1} \varepsilon_{l-1,k} S^*(\omega_k) e^{j\omega_k \tau_l}}{\sum_{k=0}^{K-1} |S^*(\omega_k)|^2} \quad (12)$$

The recursive minimization in Eq. (7) makes it convenient to determine the number of multipaths L. For example, the recursive minimization can be stopped if the frequency-domain matching error goes below a certain threshold. The recursive minimization can also be stopped if there is no significant difference in the frequency-domain matching errors between consecutive iterations, which may indicate that more iterations with more multipaths may not yield meaningful improvement. Then the number of iterations can be considered to be the effective number of multipaths.

The recursive minimization can also be applied to time-domain channel observations:

$$\text{minimize } J_{T,l}(\alpha_l, \tau_l | \alpha_0, \ldots, \alpha_{l-1}, \tau_0, \ldots, \tau_{l-1}) = \sum_{n=0}^{N-1} |\alpha_l s(t_n - \tau_l) + \delta_{l-1,n}|^p \quad (13)$$

where $J_{T,l}(\alpha_l, \tau_l | \alpha_0, \ldots, \alpha_{l-1}, \tau_0, \ldots, \tau_{l-1})$ is referred to as the time-domain matching error at iteration l, and $$\delta_{l-1,n} = \sum_{m=0}^{l-1} \alpha_m s(t_n - \tau_m) - h_n, \quad \delta_{-1,n} = -h_n \quad (14)$$

is referred to as the mismatch in the time domain at iteration l-1. Note that when the error norm p=2, Eq. (13) can be solved in the frequency domain by transforming the time-domain channel observations $h_n$ to the frequency domain channel observations $y_k$.

Figure 2:
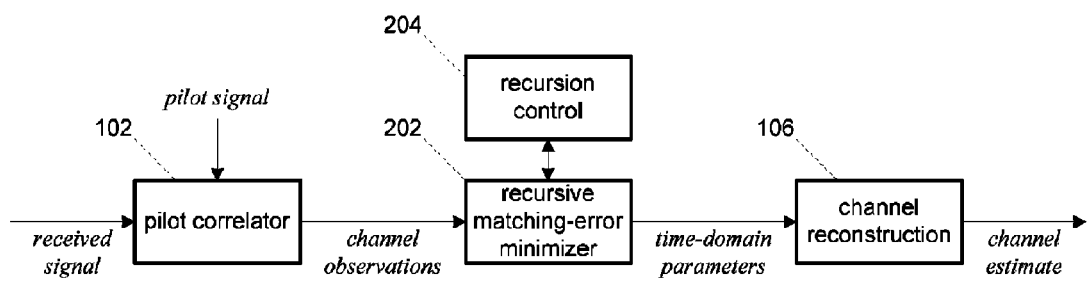
FIG. 2 illustrates an example block diagram for channel estimation by TDP extraction with recursive minimization of the matching error.

FIG. 2 illustrates an example block diagram for channel estimation by TDP extraction with recursive minimization of the matching error. Recursive matching-error minimizer 202 replaces matching-error minimizer 104 in FIG. 1. Recursion control apparatus 204 controls when to stop the recursive minimization.

The results of the recursive minimization can be further refined. For example, the TDPs from the recursive minimization can be used as an initial guess for the full minimization in Eq. (3) or (4). Many algorithms, such as Newtonian method, exist for solving the minimization in Eq. (3) or (4) with an initial guess. That the solution of the recursive minimization is refined can be seen from the fact that the matching error from Eqs. (3) and (4) is no larger, and in general, smaller than that from Eqs. (7) and (13), respectively.

Alternatively, the refinement can be made by minimizing the matching error given the solved multipath delays $\tau_0, \ldots, \tau_l$ from the recursive minimization. Assuming the frequency-domain channel observations are used, the minimization is defined as follows:

$$\text{minimize } J_F(\alpha_0, \ldots, \alpha_l | \tau_0, \ldots, \tau_l) = \sum_{k=0}^{K-1} \left| S(\omega_k) \sum_{m=0}^{l} \alpha_m e^{-j\omega_k \tau_m} - y_k \right|^p \quad (15)$$

That is, the minimization is over the multipath amplitudes $\alpha_0, \ldots, \alpha_l$ while the multipath delays $\tau_0, \ldots, \tau_l$ are fixed during minimization. For p=2, the solution to Eq. (15) is LS and is given by $$\alpha = (E^H E + \sigma^2 I)^{-1} E^H y \quad (16)$$

where $\alpha = [\alpha_0 \, \alpha_1 \, \ldots \, \alpha_l]^T$, $y = [y_0 \, y_1 \, \ldots \, y_{L-1}]^T$ is the vector of frequency-domain channel observations, E is a K×(l+1) matrix whose (k, m)-th element is $S(\omega_k) e^{-j\omega_k \tau_m}$, $E^H$ denotes the Hermitian transpose of E, and $\sigma^2 \geq 0$ is the diagonal loading factor that can be used to maintain the numerical stability if $E^H E$ is ill-conditioned. That the solution of the recursive minimization is refined can be seen from the fact that the frequency-domain matching error from Eq. (15) is no larger, and in general, smaller than that from Eq. (7).

If the time-domain channel observations are used, the time-domain counterpart of Eq. (15) is as follows:

$$\text{minimize } J_T(\alpha_0, \ldots, \alpha_l | \tau_0, \ldots, \tau_l) = \sum_{n=0}^{N-1} \left| \sum_{m=0}^{l} \alpha_m s(t_n - \tau_m) - h_n \right|^p \quad (17)$$

For p=2, the solution to Eq. (17) is LS and is given by $$\alpha = (D^H D + \sigma^2 I)^{-1} D^H h \quad (18)$$

where $h = [h_0 \, h_1 \, \ldots \, h_{N-1}]^T$ is the vector of time-domain channel observations, and D is a N×(l+1) matrix whose (n,m)-th element is $s(t_n - \tau_m)$.

Figure 3:
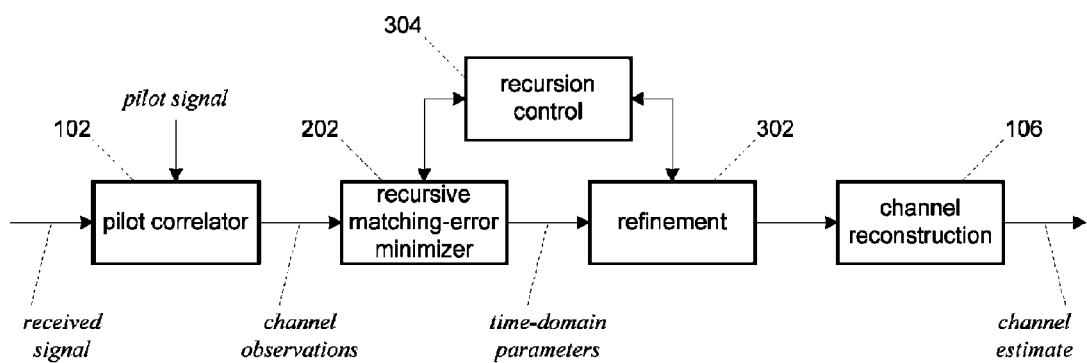
FIG. 3 illustrates an example block diagram for channel estimation by TDP extraction with recursive minimization and the TDP refinement.

FIG. 3 illustrates an example block diagram for channel estimation by TDP extraction with the recursive minimization and the TDP refinement. Refinement apparatus 302 further improves the TDP from recursive matching-error minimizer 202. Refinement apparatus 302 can use the TDPs from recursive matching-error minimizer 202 as the initial guess to solve the full minimization in Eq. (3) or (4). Alternatively, it can use the multipath delays from recursive matching-error minimizer 202 to obtain the refined multipath amplitudes that minimize the matching error as shown in Eq. (15) or (17). Recursion control 304 controls when to stop the recursive minimization. Recursion control 304 can also schedule the refinement such that the TDPs are refined either after the completion of the recursive minimization, or after each iteration during the recursive minimization.

According to some other aspects, the TDPs are extracted from the discrete time domain instead of the continuous time domain. It should be noted that the TDPs have a slightly different definition in the discrete time domain. In the continuous time domain, the TDPs are the number of multipaths, multipath delays, and multipath amplitudes. In the discrete time domain, the TDPs are the number, indices, and amplitudes of the channel taps.

It should be noted that there can be infinitely many non-zero channel taps even if there are only a finite number of multipaths, due to the possible misalignment between the multipath delays and the discrete sampling grid in the time domain. However, the sparseness of the multipath dictates that the channel energy is concentrated on only a few strong channel taps. Hereinafter term "time domain" will be used for either continuous or discrete time domain when the context is clear, and term "discrete time domain" will be used when it is necessary to distinguish from the continuous time domain.

Generally channel observations are made either in the frequency domain or in the time domain. Frequency-domain channel observations are derived from time-domain channel observations and vise versa. In an OFDM system, channel observations $y_0, y_1, \ldots, y_{K-1}$ are made in the frequency domain at frequencies $\omega_0, \omega_1, \ldots, \omega_{K-1}$, which generally correspond to the pilot subcarrier frequencies. To extract the TDPs, time-domain channel observations need to be obtained first. The least-square (LS) solution for the vector h of time-domain channel observation is given by $$h = \begin{cases} (F_p^H F_p + \sigma^2 I)^{-1} F_p^H y & N \leq K \\ F_p^H (F_p F_p^H + \sigma^2 I)^{-1} y & N > K \end{cases} \quad (19)$$

where $F_p^H$ is a transform matrix whose (n, k)-th element is $e^{jn\omega_k}$.

Alternatively, time-domain channel observation vector h can be obtained via inverse discrete Fourier transform (IDFT). Let $N_{DFT} \geq \max(N, K)$ be the length of the IDFT. Extend vector y to vector $y_{DFT}$ of length $N_{DFT}$, such that (a) $y_{DFT}$ comprises all entries in y, and (b) entries in $y_{DFT}$ but not in y are set to zero. Let $h_{DFT}$ be the IDFT of $y_{DFT}$. Then the first N entries in $h_{DFT}$ can be chosen to form h. As an example, consider a 20-MHz LTE network in which $N_{DFT}=2048$, $K=400$. The pilot frequencies are given as follows:

$$\omega_k = \begin{cases} 2\pi(3k+1)/2048 & 0 \leq k \leq 199 \\ 2\pi(3k+848)/2048 & 200 \leq k \leq 399 \end{cases} \quad (20)$$

The pilot pattern in Eq. (20) has a decimation-by-3 structure, and therefore can only support channel lengths less than one-third of $N_{DFT}$, thus N can be chosen to satisfy $N \leq 2048/3$. Note that Eq. (20) shows that there is about one pilot subcarrier in every three subcarriers, which means that the entries in h from $h_{DFT}$ need to be scaled by a factor of about 3. This scaling factor can also be determined by minimizing the matching error in the time domain or in the frequency domain.

Let M be the number of the channel taps to be used in channel estimation. The M channel taps are selected based on a strength function $s(h_n)$ of the time-domain channel observations $h_n$, n=0, 1, . . . , N−1. The strength function $s(h_n)$ characterizes the "strength" of $h_n$. The following are a few examples of the choices for the strength function:

$$s(h_n) = |Re\{h_n\}| + |Im\{h_n\}| \quad (21)$$

$$s(h_n) = \max(|Re\{h_n\}|, |Im\{h_n\}|) \quad (22)$$

$$s(h_n) = |h_n|^2 = Re^2\{h_n\} + Im^2\{h_n\} \quad (23)$$

The strength function in Eq. (23) is the energy of the time-domain channel observation $h_n$. It can be appreciated that other strength functions can be used as well. For two time-domain channel observations $h_n$ and $h_m$, $h_n$ is said to be stronger than $h_m$ if $s(h_n) > s(h_m)$. One approach to extracting the TDPs is to choose the first M strongest time-domain channel samples as the channel taps. The TDPs are then characterized by the indices and the amplitudes of the selected channel taps, i.e., $\{h_n, n \in C\}$, where C is the index set of the TDPs, containing the indices of the first M strongest channel taps.

The amplitudes in the TDPs can be further refined by minimizing the following frequency-domain matching error:

$$\text{minimize } J(\{h_n, n \in C\} \mid C) = \sum_{k=0}^{K-1} \left| \sum_{n \in C} h_n e^{-jn\omega_k} - y_k \right|^p \quad (24)$$

When p=2, the solution of Eq. (24) is given by $$h_{TDP} = (F_{p,TDP}^H F_{p,TDP})^{-1} F_{p,TDP}^H y \quad (25)$$

where $F_{p,TDP}$ is a submatrix of $F_p$, with columns of $F_p$ whose indices are in C, and $h_{TDP}$ is the vector containing the channel taps in C. Eq. (25) assumes that $M \leq K$, which generally holds true in wireless channels where M is expected to be much smaller than K. To ensure the numerical stability with ill-conditioned $(F_{p,TDP}^H F_p)^{-1}$, diagonal loading can be used. In this case the solution becomes $$h_{TDP} = (F_{p,TDP}^H F_{p,TDP} + \sigma^2 I)^{-1} F_{p,TDP}^H y \quad (26)$$

Note that the diagonal loading factor $\sigma^2$ does not necessarily take the same value as used in Eq. (19). Note that the solution in Eq. (25) or Eq. (26) correspond to the LS solution.

Alternatively, the amplitude refinement can be obtained by minimizing a Bayesian risk. When the Bayesian risk is the mean squared error, the problem then becomes Bayesian minimum mean squared error (BMMSE). The BMMSE solution is given by $$h_{TDP} = CF_{p,TDP}^H (F_{p,TDP} CF_{p,TDP}^H + N_0 I)^{-1} y \quad (27)$$

where $N_0$ is the variance of the channel observation noise, and $C = E\{h_C h_C^H\}$ is the covariance matrix of $h_C$, with $h_C$ being the channel amplitudes at indices in C. Since exact knowledge of C is not available, some approximations are needed if the BMMSE solution is to be used. One approximation is to assume that C is diagonal. Another approximation is to use $|h_n|^2$, $n \in C$ as the diagonal elements of C. If the time-domain channel observation $h_n$, $n \in C$ is the average of Q channel observations, i.e., $h_n = (\Sigma_q h_{n,q})/Q$, then $(\Sigma_q h_{n,q} h^*_{m,q})/Q$, n, $m \in C$ can be used to approximate the elements in C. In this case, it is not necessary to assume that C is diagonal. It should be noted that the approximations of the elements of C can also have other choices, such as the estimates of the power delay profile (PDP) of the channel.

The number of the channel taps M in the TDPs can be determined based on the channel delay spread. Generally, longer channel delay spread requires more channel taps, while shorter channel delay spread needs fewer channel taps. Due to the sparseness of the multipaths, however, M can be expected to be much smaller than either the channel length N or the number of pilot subcarriers K, regardless of the channel delay spread. The channel delay spread changes much more slowly than the channel itself, thus can be reliably estimated. The estimated channel delay spread can then be used for choosing M.

According to some aspects, the probability of fake channel taps due to noises in time-domain channel observations can be significantly reduced. When choosing the first M strongest channel taps from the time-domain channel observations, some of the channel taps may be fake ones, i.e., they are contributed by the channel observation noises and contain very little or no channel energy. The probability of fake channel taps increases as the SNR in time-domain channel observations decreases. A threshold-based approach can be used to reduce the probability of fake channel taps as follows. If the strength of a selected channel tap is less than a threshold $T_f$, then that channel tap is removed from the first M strongest channel taps.

The entries in time-domain channel observation vector h can be modeled as follows:

$$h_n = \bar{h}_n + v_n \quad (28)$$

where $\bar{h}_n$ is the "true" amplitude, and $v_n$ is the noise with variance $V = E\{v_n v_n^*\}$. Assuming that the energy of the time-domain channel observation is used as the strength function, one choice for $T_f$ is that $$T_f = aV \quad (28)$$

where a is a predetermined constant. $T_f$ in Eq. (28) is inversely proportional to SNR. The advantage of such a choice can be seen as follows. At low SNR, $T_f$ is higher, and it is more likely that a fake channel tap will be removed, whereas the channel estimation accuracy is not sensitive to incorrectly removed useful channel taps at low SNR. At high SNR, $T_f$ is lower, and it is unlikely that a useful channel tap is incorrectly removed.

The variance V depends on the variance $N_0$ of the channel observation noise. Numerous methods for estimating $N_0$ exist so V can be estimated as well, and then $T_f$ can be obtained via Eq. (28). More generally, a can also be made dependent of V, then $T_f$ is simply SNR dependent.

After the removal of the fake channel taps, the index set C consists of only the channel taps exceeding threshold $T_f$ from the first M strongest channel taps.

The extracted TDPs comprise the full information of the channel estimation from channel observations. The estimated channel can be reconstructed from the TDPs. In the frequency domain, the channel estimate is given by $$\hat{y}_k = \sum_{n \in C} h_{TDP,n} e^{-jn\omega_k} \quad (29)$$

where $h_{TDP,n}$, are the entries in $h_{TDP}$, $\hat{y}_k$ is the channel estimate at frequency $\omega_k$. In an OFDM system, $\omega_k$ can be the frequency of a pilot subcarrier or a non-pilot subcarrier. In the time domain, the channel estimate is given by $$\hat{h}_n = \begin{cases} h_{TDP,n} & n \in C \\ 0 & n \notin C \end{cases} \quad (30)$$

where $\hat{h}_n$ is the channel estimate at time index n. Eqs. (29) and (30) show that the channel estimates can be indeed reconstructed by the TDPs either in the frequency domain or in the time domain.

According to some more aspects, spectrum shaping can be used for removing out-of-band channel component. If the refinement of the TDP amplitudes is obtained by minimizing certain error measure in the frequency domain, such as the matching error in Eq. (24), or if frequency-domain channel observations do not cover the entire sampling bandwidth, then the channel estimate reconstructed from the TDPs may generate out-of-band channel energy, i.e., the spectrum of the estimated channel has certain energy level in some parts of the frequency region that is not covered by frequency-domain channel observations. In some applications such as OFDM, out-of-band channel energy may not be of concern since the channel estimation quality is measured only over the frequency region covered by frequency-domain channel observations. In some other applications where the channel estimation quality in the time domain is of importance, the out-of-band channel energy may be undesirable since it may create distortions in the time-domain representations of the channel.

Out-of-band channel energy can be suppressed by spectrum shaping. A filter that has a zero response in the frequency region where no signal component is expected removes the out-of-band channel component. In the meantime, such a filter should also have a flat and unit response over the frequency region where channel observations are made so that the channel estimation quality will remain intact. Let p(n) be a spectrum-shaping filter with a spectrum $P(\omega_k)$ that has the above properties. Then after spectrum shaping, the frequency-domain channel estimate in Eq. (29) becomes $$\hat{y}_k = P(\omega_k) \sum_{n \in C} h_{TDP,n} e^{-jn\omega_k} \quad (31)$$

and the time-domain channel estimate in Eq. (30) becomes $$\hat{h}_n = \sum_{m \in C} h_{TDP,m} p^{(n-m)} \quad (32)$$

Figure 4:
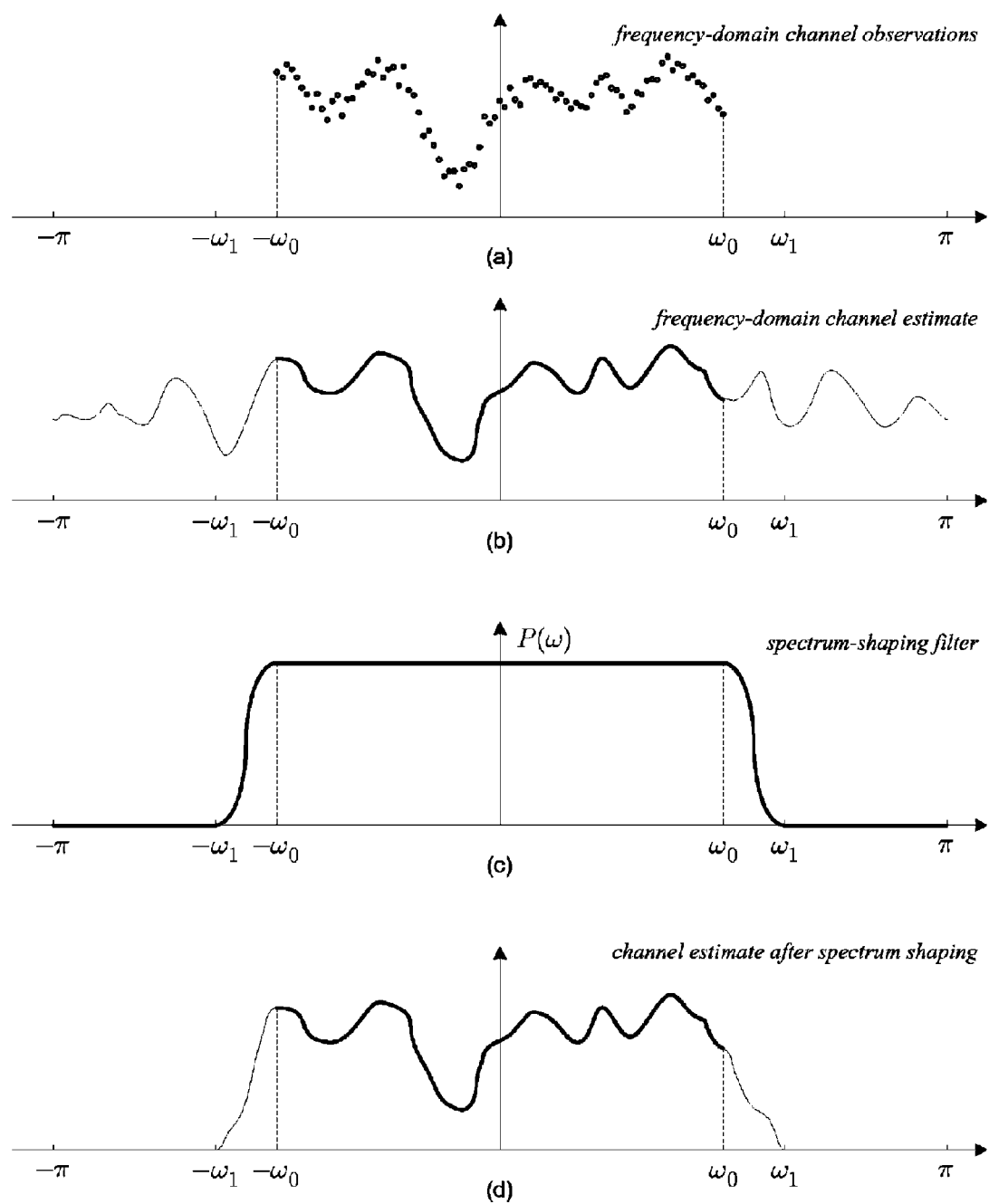
FIG. 4 illustrates the phenomenon of out-of-band channel energy and the use of the spectrum shaping.

FIG. 4 illustrates the phenomenon of out-of-band channel energy and the use of the spectrum shaping. FIG. 4(a) shows an exemplary set of frequency-domain channel observations. The channel observations are made over $[-\omega_0, \omega_0]$ with $\omega_0 < \pi$. FIG. 4(b) shows an exemplary frequency-domain channel estimate, which has energy beyond $[\omega_0, \omega_0]$. FIG. 4(c) shows the frequency response $P(\omega)$ of a spectrum shaping filter. FIG. 4(d) shows that after spectrum shaping, the out-of-band channel energy over $[-\pi, -\omega_1] \cup [\omega_1, \pi]$, where $\omega_1 \geq \omega_0$, is removed.

It should be noted that after spectrum shaping, the time-domain channel estimate in Eq. (32) can have many more channel taps with non-negligible channel energy than the one in Eq. (30). Still, the number of the TDPs for channel reconstruction remains the same.

Figure 5:
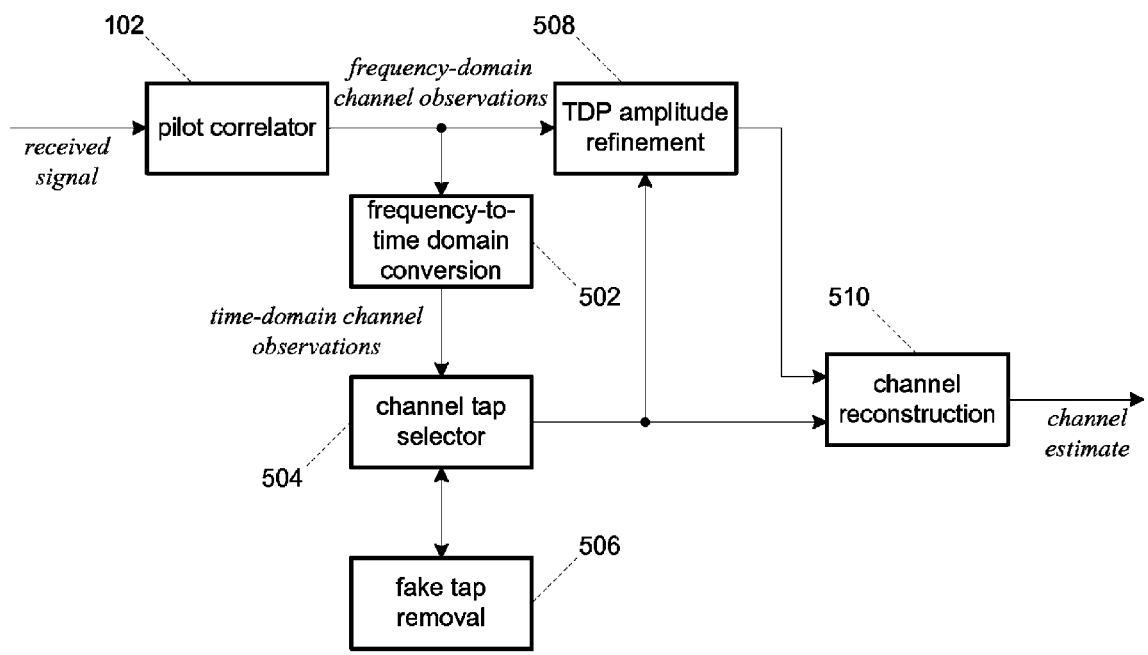
FIG. 5 illustrates an example of channel estimation in an OFDM system.

FIG. 5 illustrates an example of channel estimation in an OFDM system. Pilot correlator 102 generates channel observations by correlating the received signal with the pilot signal. Since the received signal is OFDM, the correlation can be performed via DFT. Pilot correlator 102 outputs frequency-domain channel observations. Frequency-to-time domain conversion apparatus 502 converts frequency-domain channel observations into time-domain channel observations. Various methods can be used for conversion, such as LS and IDFT. Channel tap selector 504 selects a certain number of the strongest channel taps from the output of frequency-to-time domain conversion apparatus 502. Fake tap removal apparatus 506 removes those selected channel taps whose strengths are below a certain threshold to minimize the probability of the fake channel taps. The output of channel tap selector 504 is the indices of the strongest channel taps whose strengths are above the threshold for fake tap removal. TDP amplitude refinement apparatus 508 computes the amplitudes of the channel taps over the indices provided by channel tap selector 504. The channel tap amplitudes can be refined based on various criteria such as LS and BMMSE. The extracted TDPs are then the output of TDP amplitude refinement apparatus 508 and the output of channel tap selector 504. Channel reconstruction apparatus 510 uses the extracted TDPs to reconstruct the channel to generate the channel estimate. While for OFDM signals, the channel estimate is often given in the frequency-domain, in general channel reconstruction can be in the time domain or in the frequency domain or in both domains. Note that if out-of-band channel energy is not desired, channel reconstruction apparatus 510 may also apply spectrum shaping to the reconstructed channel. The output of channel reconstruction apparatus 510 is the channel estimate by TDP extraction.

It can also be appreciated that, since the number of the TDPs is much smaller than the number of pilot subcarriers, channel estimation based on TDP extraction requires much fewer computations than existing methods. Take the matrix inversion for example. In TDP extraction, the matrix dimension depends on the number M, say, 20, of the channel taps, whereas in existing methods, the matrix dimension depends on the number of pilot subcarriers, which can be as high as 400 in LTE networks.

CONCLUSION, RAMIFICATIONS, and SCOPE

Accordingly it will be seen that channel estimation by TDP extraction significantly improves the channel estimation quality. The improved channel estimation quality translates to the receiver performance in terms of the bit-error rate, throughput, etc. The TDP extraction is also highly efficient in computations.

Various aspects of the subject disclosure are described with LTE cellular networks. It is to be understood and appreciated that the principles of the subject disclosure also apply to other wireless networks and systems, such as wireless local area network (WLAN), as well as to general communication networks.

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method for channel estimation, comprising:
   (a) generating a set of frequency-domain channel observations in the frequency domain,
   (b) generating a set of time-domain channel observations in the time domain,
   (c) selecting channel taps from said time-domain channel observations according to a strength function of said time-domain channel observation,
   (d) refining complex amplitudes of said channel taps by minimizing a frequency-domain matching error, which is a contribution of said channel taps,
   (e) forming a set of time-domain parameters comprising:
      (i) number of said channel taps,
      (ii) indices of said channel taps, and
      (iii) refined complex amplitudes of said channel taps, and
   (f) reconstructing said channel with said set of said time-domain parameters,
   whereby the reconstructed channel provides channel estimates that are more accurate than said channel observations.

2. The method of claim 1, wherein generating said set of time-domain channel observations comprises deriving said set of time-domain channel observations from said set of frequency-domain channel observations.

3. The method of claim 2, wherein deriving said set of time-domain channel observations uses the least-square method.

4. The method of claim 2, wherein deriving said set of time-domain channel observations uses the inverse discrete Fourier transform method.

5. The method of claim 1, wherein selecting said channel taps comprises:
   (a) selecting a predetermined number of strongest channel taps from said time-domain channel observations according to said strength function, and
   (b) performing fake tap removal by removing those said strongest taps, whose strengths are below a predetermined threshold, from said predetermined number of said strongest taps.

6. The claim of claim 5, wherein said predetermined threshold depends on the signal-to-noise ratio in said time-domain channel observations.

7. The method of claim 1, wherein said strength function is the energy of said time-domain channel observation.

8. The method of claim 1, wherein refining said complex amplitudes of said channel taps by minimizing said frequency-domain matching error comprises employing the least-square method to compute said complex amplitudes.

9. The method of claim 8, wherein employing said least-square method further comprises diagonal loading.

10. The method of claim 1, wherein refining said complex amplitudes of said channel taps by minimizing said frequency-domain matching error comprises employing Bayesian minimum mean-square error (BMMSE) method to compute said complex amplitudes.

11. The method of claim 1, wherein reconstructing said channel further comprises spectrum-shaping to suppress the out-of-band channel energy.

* * * * *